United States Patent
Ludovico et al.

(10) Patent No.: US 7,962,178 B2
(45) Date of Patent: Jun. 14, 2011

(54) METHOD AND SYSTEM FOR CONFIGURING A COMMUNICATION NETWORK, RELATED NETWORK AND COMPUTER PROGRAM PRODUCT

(75) Inventors: Michele Ludovico, Turin (IT); Antonio Orlando, Turin (IT); Loris Paolo Stola, Turin (IT); Francesco Coppi, Turin (IT)

(73) Assignee: Telecom Italia S.p.A., Milan (IT)

( * ) Notice: Subject to any disclaimer, the term of this patent is extended or adjusted under 35 U.S.C. 154(b) by 341 days.

(21) Appl. No.: 12/308,897

(22) PCT Filed: Jun. 30, 2006

(86) PCT No.: PCT/EP2006/006394
§ 371 (c)(1),
(2), (4) Date: Dec. 29, 2008

(87) PCT Pub. No.: WO2008/000293
PCT Pub. Date: Jan. 3, 2008

(65) Prior Publication Data
US 2009/0305717 A1    Dec. 10, 2009

(51) Int. Cl.
*H04M 1/00* (2006.01)
(52) U.S. Cl. ............... 455/562.1; 455/562; 455/446
(58) Field of Classification Search .......... 455/562.1, 455/562, 446; 342/367
See application file for complete search history.

(56) References Cited

U.S. PATENT DOCUMENTS
5,953,669 A    9/1999 Stratis et al.
6,421,005 B1 *  7/2002 Weaver et al. ............ 342/367
(Continued)

FOREIGN PATENT DOCUMENTS
WO    WO-99/30448    6/1999
(Continued)

OTHER PUBLICATIONS

G. Bussolino et al., "Rasputin: a field strength prediction model for large and small mobile cell system using territorial database", 7th International Network Planning Symposium, pp. 191-196, (1996).

(Continued)

*Primary Examiner* — Danh C Le
(74) *Attorney, Agent, or Firm* — Finnegan, Henderson, Farabow, Garrett & Dunner, L.L.P.

(57) ABSTRACT

An antenna site equipped with reconfigurable antennas in a communication network and having capacity to serve communication traffic in a respective area of competence is configured by partitioning the area the area of competence into a set of cells. The number of cells in the set is optimized by ensuring that the traffic is evenly distributed among the cells. This result is preferably achieved starting from a reference set of cells by locating: —i) areas of superposition between adjacent cells covered jointly by traffic capacity of adjacent cells in the reference set of cells, and—ii) uncovered areas between adjacent cells, that is, areas not covered by traffic capacity of any cells in the reference set of cells. The areas of superposition are removed and the traffic capacity thus made available is assigned to the uncovered areas. If any uncovered areas remain, the number of cells in the reference set of cells is increased and the process repeated. If no uncovered areas between adjacent cells are located, the possibility exists of decreasing the number of cells in the reference set of cells and the process is repeated to check whether the area of competence can be properly covered with a lower number of cells.

20 Claims, 14 Drawing Sheets

U.S. PATENT DOCUMENTS

| | | | |
|---|---|---|---|
| 6,424,310 B1 * | 7/2002 | Broas et al. | 343/781 P |
| 6,903,701 B2 | 6/2005 | Forigo et al. | |
| 6,915,123 B1 * | 7/2005 | Daudelin et al. | 455/410 |
| 7,289,763 B2 * | 10/2007 | Dennison et al. | 455/12.1 |
| 7,570,956 B2 * | 8/2009 | Bigham et al. | 455/453 |
| 2003/0060205 A1 * | 3/2003 | Shapira | 455/446 |
| 2003/0073463 A1 * | 4/2003 | Shapira | 455/562 |
| 2004/0029538 A1 | 2/2004 | Holma et al. | |
| 2004/0166902 A1 * | 8/2004 | Castellano et al. | 455/562.1 |

FOREIGN PATENT DOCUMENTS

| | | |
|---|---|---|
| WO | WO-02/01672 A1 | 1/2002 |
| WO | WO-03/045094 A1 | 5/2003 |
| WO | WO-2005/004515 A1 | 1/2005 |

OTHER PUBLICATIONS

Menolascino et al.; "Planning A Third Generation Mobile Network With Adaptive Antennas"; Vehicular Technology Conference, IEEE, pp. 648-652, (1999).

Holma et al.; "Radio Network Planning"; WCDMA for UMTS—HSPA Evolution and LTE, Fourth Edition, John Wiley & Sons, Ltd., pp. 191-193, (2007).

Mailloux; "Pattern Systhesis for Linear and Planar Arrays"; Phased Array Antenna Handbook, 2nd Edition, Artech House, pp. 109-121, (2005).

* cited by examiner

US 7,962,178 B2

METHOD AND SYSTEM FOR CONFIGURING A COMMUNICATION NETWORK, RELATED NETWORK AND COMPUTER PROGRAM PRODUCT

CROSS REFERENCE TO RELATED APPLICATION

This application is a national phase application based on PCT/EP2006/006394, filed Jun. 30, 2006, the content of which is incorporated herein by reference.

FIELD OF THE INVENTION

The invention refers to the configuration of communication networks.

The invention was developed with specific attention paid to its possible use in the optimization of second and/or third generation mobile communication networks using reconfigurable antennas. Reference to this preferred field of use is not however to be construed in a limiting sense of the scope of the invention.

DESCRIPTION OF THE RELATED ART

Reconfigurable antennas (i.e. antennas adapted to modify their radiation pattern characteristics) represent a powerful tool for improving performance of the radio access portion of mobile telecommunication networks. This applies both to the extension of coverage area and to capacity, that is the number of users for which service is guaranteed.

Research in the area of telecommunications and related technological development over the recent years has led to the possibility of designing and manufacturing various types of reconfigurable radiating systems. Specifically, in addition to conventional antennas—that are essentially "passive" components—electrically controllable antennas are now available for communication systems, especially for use as base stations in mobile telecommunication systems. So far, the availability of these "reconfigurable" antennas (typically in the form of so-called phased-array antennas) has been exploited primarily with a view to adapting the antenna characteristics to the requirements of network planning, this while dispensing, inasmuch as possible, with the need of direct interventions at the antenna site when the antenna characteristics need to be modified.

For instance, WO-A-2005/004515 discloses a communication network including a plurality of antennas which is configured by including among the antennas at least one reconfigurable antenna adapted to serve communication traffic in a respective coverage area. The reconfigurable antenna has a radiation diagram exhibiting a plurality of selectively adjustable gain values for a set of directions, wherein each direction in the set defines a propagation path between the antenna and a portion of the coverage area. For each direction in the set, at least one value of communication traffic and at least one attenuation value over the propagation path are determined. A gain value is then selectively and independently allotted to each direction in the set as a function of at least one of the value of communication traffic and the attenuation value determined for that direction.

In WO-A-03/045094 an arrangement is disclosed including a statistical smart antenna configuration wherein antenna patterns associated with various base stations of the communication network are configured by taking into account the morphology and topology of the service area. Antenna patterns are configured using merit-based determinations based upon link propagation conditions such as those associated with the morphology and topology of the service area, with the aim of positively serving areas which are best served by the network being optimized while not serving areas which are best served by other network systems.

OBJECT AND SUMMARY OF THE INVENTION

The Applicants have noted that a need can exist for arrangements admitting a higher degree of flexibility in optimizing the number of cells associated to an antenna site of a communication network.

Specifically, a need is felt for arrangements wherein said optimization process involves the number and the shapes of the radiation diagrams of reconfigurable antennas equipping the radio base stations (e.g. the antenna "sites") in the communication network, with a view to reduce interference and balance the load (offered traffic) for each antenna site.

The object of the invention is thus to provide a satisfactory response to those needs.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

The Applicant has found that this problems can be solved by a method for configuring an antenna site equipped with at least one reconfigurable antenna in a communication network, such as e.g. 2G or 3G mobile communications network, wherein the antenna site has capacity to serve communication traffic in a respective coverage area (area of competence); the coverage area is partitioned into a reference set of cells, each cell corresponding to a portion of the coverage area over which a specific set of radio channels is transmitted or received. The number of cells is optimized by causing an offered traffic to be evenly distributed among the cells. This result is achieved by checking the cells in the reference set to locate:

i) areas of superposition between adjacent cells, i.e. areas covered jointly by traffic capacity of adjacent cells in the reference set of cells, and ii) uncovered areas between adjacent cells, i.e., areas not covered by traffic capacity of any cell in said reference set of cells.

The areas of superposition are removed, so that traffic capacity is made available from either of the adjacent cells that gave rise to superposition. This traffic capacity is assigned to the uncovered areas. If any uncovered areas remain at the end of the process, the number of cells in the reference set is increased and the process is repeated in an iterative way. If no uncovered areas between adjacent cells are located, the number of cells in the reference set is reduced in order to ascertain whether adequate coverage can be assured with a lower number of cells.

In a preferred aspect the arrangements described herein, after determining the number of cells, associates a radiation diagram (in the horizontal direction H and in the vertical direction V) to each cell e.g. by resorting to the arrangement disclosed for example in WO-A-2005/004515.

In a further preferred aspect the information concerning the number of cells and the related radiation diagrams can be sent to a control unit which controls at least one reconfigurable antenna of the antenna site, said reconfigurable antenna comprising a plurality of radiating elements. For each cell associated with the at least one reconfigurable antenna, the control unit produces a related radiation diagram by modifying amplitudes and phases of the signals transmitted or received through the radiating elements of the reconfigurable antenna.

Essentially, the arrangement described optimizes the number and the shapes of the cells and of the related radiation diagrams of the reconfigurable antenna(s) equipping an antenna site on the basis of a number of factors: these typically include both the propagation characteristics of the antenna site and the offered traffic levels in the coverage areas associated to the site.

As a result, interference can be reduced and the load (offered traffic) for each site properly balanced in order to reduce the probability of block/congestion.

BRIEF DESCRIPTION OF THE ANNEXED REPRESENTATIONS

The invention will now be described, by way of example only, with reference to the enclosed representations, wherein.

DETAILED DESCRIPTION OF PREFERRED EMBODIMENTS OF THE INVENTION

Figure 16:
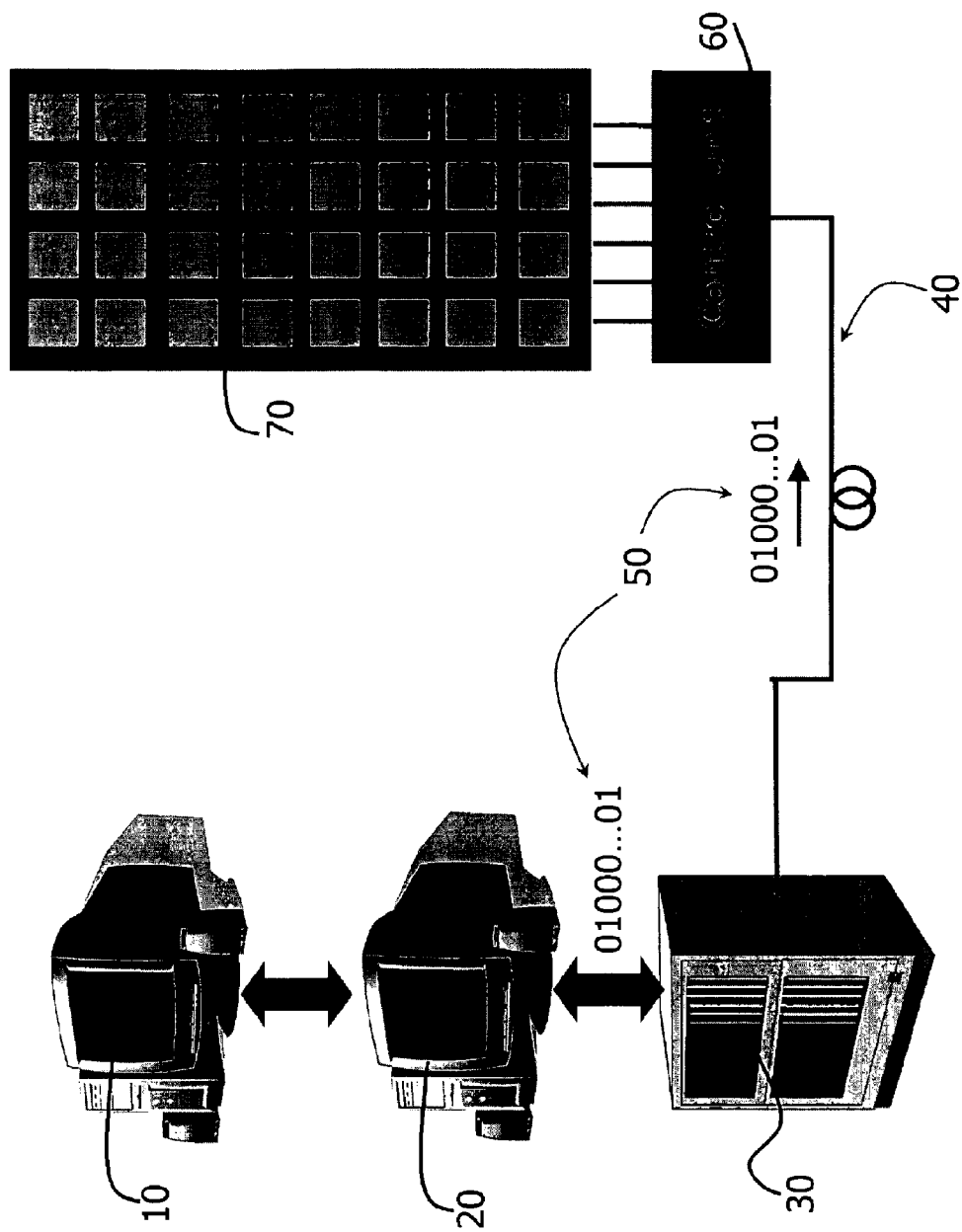
FIG. 16 is a block diagram representation of a possible embodiment of a system as described herein.

The arrangement (method and system) described herein is adapted for use in optimizing a communication network (generally a mobile communication network, even though use in connection with e.g. a Wireless Local Area Network—WLAN can be contemplated) including at least one reconfigurable antenna: see reference 70 in the block diagram of FIG. 16. For direct reference, the following description will assume, by way of non-limiting example, that each reconfigurable antenna k is comprised of an array of $N_k \times M_k$ elements.

The method and system described herein uses as a first input a description of the network indicating the presence and location of the sites equipped with reconfigurable antennas: it will be appreciated that these "reconfigurable sites" may represent just a portion of the sites in the network.

Such a description of the network may be a file in tabular form containing, for each of the sites in the network, a set of items of information such as, e.g.:
- the location of the site in geographical coordinates (latitude, longitude);
- a Boolean variable that indicates whether the site is reconfigurable or not (1 is for instance the value for reconfigurable site and 0 for not reconfigurable site);
- the number of antennas installed at the site;
- the pointing of each antenna (tilt and azimuth); and
- the input power to each antenna.

Typically, the radiation diagram of each antenna is represented, in a manner known per se, as a pair of vectors representative of the cross sections of the radiation diagram in the horizontal plane (H) and the vertical plane (V). The three-dimensional diagram can be reconstructed from the H/V sections, for instance as described in U.S. Pat. No. 6,903,701.

Figure 3:
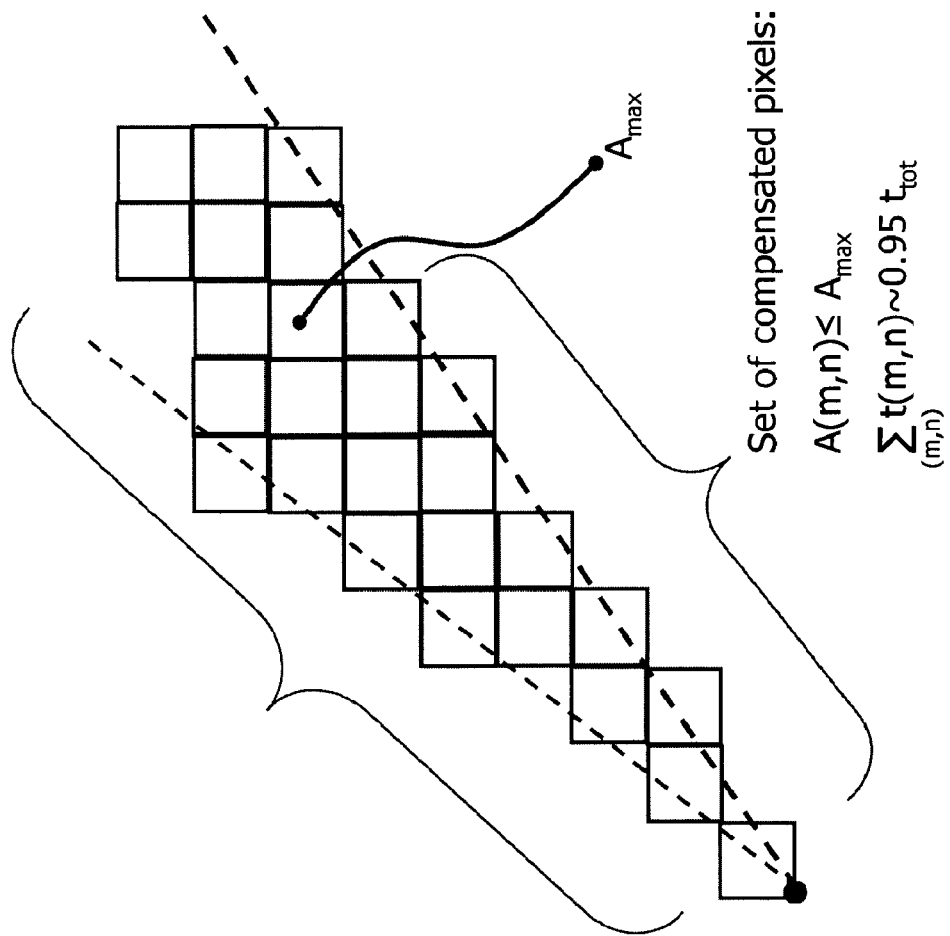
FIG. 3 is a schematic representation of processing of information related to each cell or sector within the framework of the arrangement described herein.

A second input to the method and system described herein is a structured set of territorial data stored in a data base (not shown in the figures). Specifically, the territory is discretized in elementary areas called "pixels" (see for instance FIG. 3, to be described in greater detail in the following) and the territorial data are stored in the database. This occurs preferably in the form of matrixes and/or vectors, but reference to this specific arrangement should not be construed in a limiting sense of the scope of the invention. In such a matrix organization of the territorial data each individual element in a matrix is associated to a particular pixel and contains the numerical value of a corresponding territorial attribute. For instance, the territorial data may include:
- a traffic matrix whose elements are representative of the values of the traffic expected for a given service in the respective pixels in a "sector";
- a matrix of altitudes, whose elements are representative of the values of the (average) altitude over sea level of the respective pixels;
- a morphology matrix, whose elements are indicative of the morphologies of the respective pixels, in that these values are representative of codes each associated with one morphological characteristic or feature of the respective the pixel (e.g.: thick wood, thin wood, orchard, vegetated agricultural area, uncultivated area, barren area, etc.); and
- a building matrix, whose elements are representative of the percentages of building present in the respective pixels.

A third input to the method and system described herein is a set of the parameters included in a configuration file. These parameters will be described in detail in the following.

Figure 1:
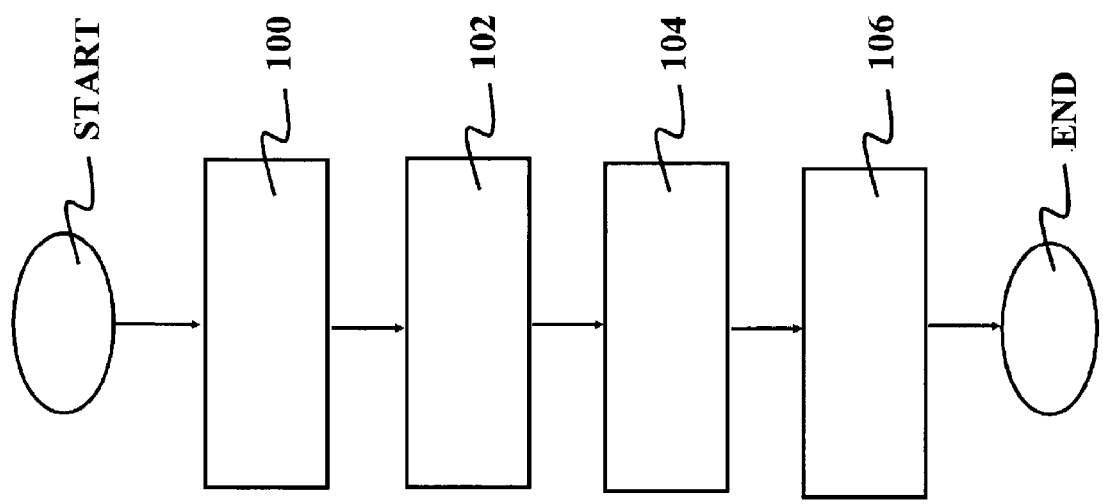
FIG. 1 is a flowchart representative of certain processing steps performed within the framework of the arrangement described herein.

Turning now specifically to the flow chart of FIG. 1, starting from a "START" step and ending with an "END" step, the method and system described herein define for each of the reconfigurable sites in the network:
- an area of competence of the reconfigurable site (step 100);
- an optimum number of cells associated to the reconfigurable site and the optimum angular amplitudes of the various sectors associated therewith (step 102);
- an optimum radiation diagram on the vertical (V) plane (step 104); and
- an optimum radiation diagram on the horizontal (H) plane.

For the purpose of the present invention, a cell is defined as a portion of the coverage area over which a specific set of radio channels is transmitted or received. Typically, a cell is associated with an identification or pilot channel. In particular, in current second and third generation networks an identification or pilot channel (e.g. a Broadcast Control CHannel or BCCH for 2nd generation networks or a Common Pilot CHannel or CPICH for 3rd generation networks) is associated with each cell.

The related optimization process operates independently for each site. Consequently, an explicit indication of the site involved will be omitted throughout the rest of this description.

As indicated, the step 100 involves the definition of an area of competence of the reconfigurable site. As used herein, the designation "area of competence" designates a portion of the territory covered by the network wherein a certain service is expected to be guaranteed by means of a given site.

Typically, the areas of competence of the different sites are identified as described in the following.

The radiation diagrams corresponding to the antennas already installed/planned for the non-reconfigurable sites are first considered, on a cell-by-cell basis. For each such cell a corresponding value of transmission power is defined in the configuration file supplied as an input to the method and system described herein.

Conversely, for the reconfigurable sites a reference configuration is considered which is comprised of N cells each associated with a related radiation diagram. In a presently preferred embodiment N=1 and an isotropic diagram is assumed. A power level $P_{ISO}$ is associated to such an isotropic diagram based on the following relationship:

$$P_{ISO}=G_{AR}*P_{AVE}$$

where:
- $G_{AR}$ is the average gain expected for reconfigurable antenna,
- $P_{AVE}$ is the average power level over the power levels associated to the site antennas, which are known from the network description file.

Starting from such radiation diagrams, "field" matrixes are calculated for each cell. These matrixes provide, for each pixel (m, n) in the area considered, an estimate of the field received in the pixel as a function of the transmitted power level associated to the cell considered.

In order to reduce computational time and occupation of memory, the calculation can be limited, for each cell, to the pixels included in an area limited in terms of the maximum distance from the site (i.e. the radio base station) to which the cell is associated. The electrical field can computed by resorting e.g. to the method described in G. Bussolino, R. Lanzo, M. Perucca "RASPUTIN: a field strength prediction model for large and small mobile cell system using territorial data bases", 7th International Network Planning Symposium, Sidney 1996.

The area of competence of a reconfigurable site (say "X") can be determined as the set of those pixels (m, n) that satisfy the following requirements:
- the field received at the pixel (m, n) from the isotropic antenna associated with the reconfigurable site X is higher than the fields received from cells associated with other sites of the network;
- the field received at the pixel (m, n) from the isotropic antenna associated with the reconfigurable site X is higher than a minimum threshold $E_{min}$; this threshold is defined, for instance, by considering an adequate safety margin with respect to the sensitivity of the mobile terminals; in turn this is defined by the related technology standards as the minimum power that allows the correct demodulation and decoding of the signal received in the presence of thermal noise.

A minimum power threshold can be calculated, e.g., on the basis of the following relationship:

$$P_{min}=S_{MS}+M$$

where $S_{MS}$ represents the sensitivity of the terminal and M is a safety margin currently applied in planning.

According to known criteria, the minimum field threshold $E_{min}$ can derived from the minimum power threshold $P_{min}$ by means of the following relationship:

$$E_{min}=P_{min}+77.2+20\cdot\log(f)-G_{MS}$$

where f is the operating frequency (in MHz) and $G_{MS}$ the gain of the antenna of the mobile terminal: this is typically considered equal to 0 dB for the purpose of calculating the minimum field threshold.

Figure 2:
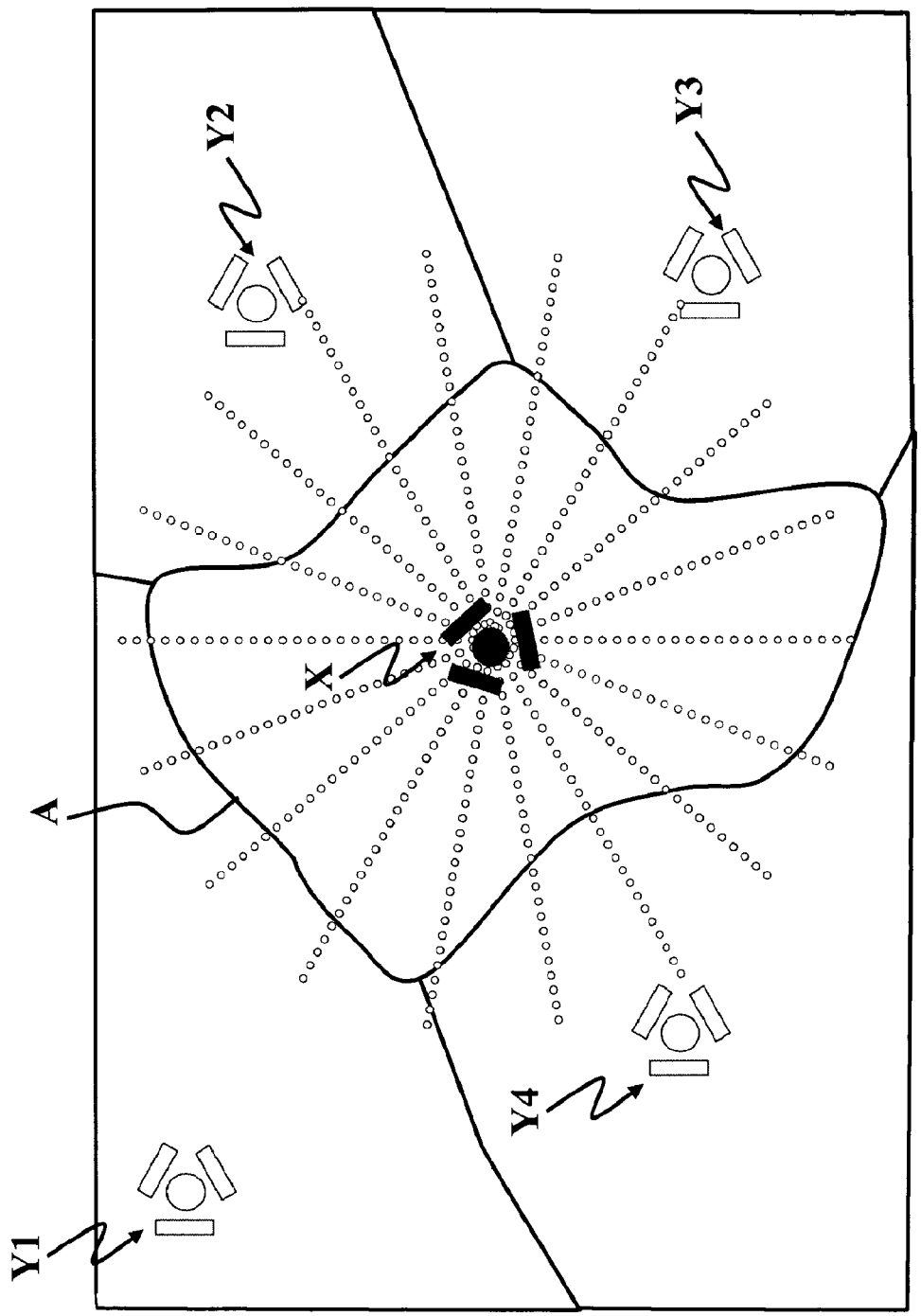
FIG. 2 is a schematic pictorial representation of a possible scenario of application of the arrangement described herein.

The area of competence for the site X (designated A in FIG. 2, where the neighboring sites are generally designated Y1, Y2, Y3, and Y4) is then partitioned into elementary sectors of constant angular amplitude: such a partitioning process takes place in the horizontal plane.

These elementary sectors represent elementary units that are then aggregated (as better detailed in the following) in sets to form angular sectors of wider amplitude. Each of these wider sectors, whose widths depend on the number of elementary sectors forming them, represents a "cell" served by a reconfigurable antenna (step 102).

For the sake of simplicity, the amplitude of each individual—elementary—sector (and, accordingly, the number of such sectors for site) is selected as a constant value for all the sites considered sites. This constant value is determined as a function of the dimensions of the area of competence A and the spatial resolution (i.e. the dimensions of the pixels) adopted.

Typical values for the angular amplitude of the elementary sectors are in the range of 5 to 20 degrees. Of course, these values are in no way binding. Similarly, for reasons of practicality (and, again, without this being in any way imperative for the invention) the amplitude of the angular sectors is chosen as an integer submultiple of 360°.

If the angular amplitude of the elementary sectors is denoted ω, the partitioning process operates in the following way. Starting from the angle "0" which corresponds to the "North" direction, the first elementary sector corresponds to the angular sector between 0 and ω. The second elementary sector corresponds to the angular sector between ω and 2ω and so on, until the whole angle of 360° is covered.

The following entities are then computed for each of the reconfigurable sites and each of the elementary sectors that make up the related areas of competence:
- the number of pixel, calculated by including all the pixels whose center belongs to the elementary sector;
- the offered traffic, calculated by adding the traffic present in the pixels belonging to the elementary sector considered. The case of a single service (e.g. voice calls) will be considered herein for the sake of simplicity of the description without any limiting effect on the invention. Multi-service scenarios can be handled e.g. by defining an equivalent "single service" traffic based on the following relationship:

$$T_{eq} = \frac{1}{R_1} \sum_{i=1}^{N_{serv}} T_i \cdot R_i$$

where $T_i$ and $R_i$ respectively denote the traffic (in Erl) and the bitrate (in kbit/s) associated with a given service i. $R_1$ denotes the bitrate of a first service, taken arbitrarily as a reference;

the representative attenuation of the elementary sector (see FIG. 3), i.e. the maximum attenuation $A_{max}$ calculated on a set of pixels (defined starting from the pixel(s) having the lowest values of attenuation) that collect a given percentage $Th_{comp}$ (for instance $Th_{comp}$=95%) of the whole traffic $t_{tot}$ on the elementary sector. The attenuation values can be calculated for each pixels belonging to an elementary sector from the values of electric field, based on the following relationship:

$$A(m,n) = P_{ISO} - E(m,n) + 77.2 + 20 \cdot \log(f)$$

where $P_{ISO}$ represents the reference power used for the definition of the competence area of the considered site, $E(m, n)$ represents the field received at the pixel $(m, n)$ from the isotropic antenna and f is the operating frequency in MHz;

maximum distance, corresponding to the distance between the site and the center of the pixel farthest away from the site among those that were used to define the representative attenuation of the sector. The distance is calculated in plane coordinates UTM.

In brief, the step 102 of the optimization process described in the following has the aim of defining the optimum number of cells associated to the site and the optimum angular amplitude of the different cells.

The main result of such a step is, for each reconfigurable antenna k considered, the definition of an optimum number $N_{cell}(k)$ of cells to be associated to that antenna. For each reconfigurable antenna k, $\phi_{az}(k)$ will denote the mechanical azimuth derived from the network description file. In the following the notation (k,j) will indicate the cell j associated to the reconfigurable antenna k.

For each such cell, the optimization process yields as an output the following entities, all of which are expressed as integer multiples of the amplitude of the elementary sector ($\omega$):

$\Delta(k,j)$: angular amplitude of the cell (k,j);

$\phi_{start}(k,j)$: angle at which the cell (k,j) begins;

$\phi_{stop}(k,j)$: angle at which the cell (k,j) ends;

$T(k,j)$: traffic offered in the cell (k,j).

For each reconfigurable antenna k, the pair of indexes (k, 1) denotes the cell that contains the azimuth $\phi_{az}(k)$ of the antenna. The following control variables are then defined whose values, equal for all the cells belonging to the reconfigurable site, represent further configuration parameters for the optimization process described herein:

$\Delta_{max}$: maximum angular amplitude of the cells;

$\delta_{az}$: maximum angular distance between azimuth (corresponding e.g. to the pointing direction in the horizontal plane of the panel that constitutes the reconfigurable antenna) and the cell boundaries, defined by the angles $\phi_{start}(k,j)$ and $\phi_{stop}(k,j)$ at which the cell (k,j) starts and ends, respectively.

Again, the angular values above are expressed as integer multiples of the amplitude of the elementary sector ($\omega$). Possible values for $\Delta_{max}$ and $\delta_{az}$ are 130° and 70°, respectively.

An object of the arrangement described herein lies in determining for each reconfigurable antenna k and, therefore, for each mechanical azimuth $\phi_{az}(k)$, the optimum number $N_{cell}(k)$ of cells to associate to that antenna.

The total number of cells associated to a given reconfigurable site will thus be determined as:

$$N_{cell}^{tot} = \sum_{k=1}^{N_{RA}} N_{cell}(k)$$

where $N_{RA}$ is the number of reconfigurable antennas associated with the site, which can be derived from the description file of the network.

The optimization process described herein aims at achieving load balancing, namely distributing as evenly (i.e. uniformly) as possible the traffic offered by the different cells of the site, by making it as close as possible to a target value. In a presently preferred embodiment, the target value $T_{target}$ is defined as:

$$T_{target} = \frac{T_{tot}}{N_{cell}^{tot}}$$

where $T_{tot}$ denotes the total traffic in the area of competence of the site.

In additionally to the target value, the optimization process considers a maximum value of traffic $T_{max}$ that can be borne by a single cell. This value can be estimated in operation depending on the network technology involved. For instance, for second generation mobile communication networks, the value for $T_{max}$ can be derived from the number of channels assigned to the cell. For third generation mobile communication networks, the value for $T_{max}$ can be derived via pole capacity analysis (see, for instance: "WCDMA for UMTS", edited by H. Holma and A. Toskala, Wiley, pp. 191-193).

A significant feature of the optimization process described herein lies in that it provides a way of estimating, and thus optimizing, the number of cells associated to reconfigurable antennas as well as the angular amplitude of each of said cells.

Figure 4:
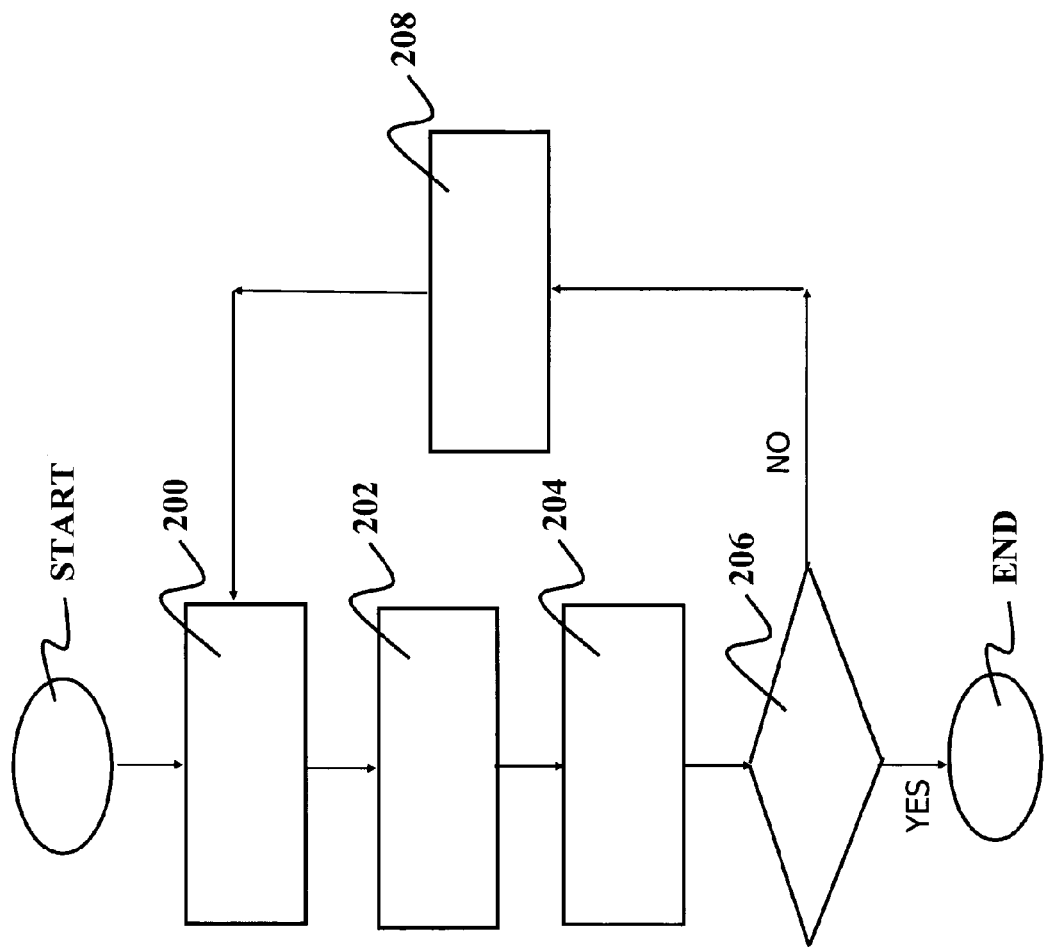
FIG. 4 is another flowchart representative of certain processing steps performed within the framework of the arrangement described herein.

This result is achieved in an iterative way as better represented by the flow chart of FIG. 4. The iterations of FIG. 4 do not require any modifications in the values previously set for $T_{tot}$ and $T_{max}$ and are usually started by setting $N_{cell}(k)$=1 for all the reconfigurable antennas while hypothesizing a maximum value for $N_{cell}(k)$ equal to, e.g., 4.

The flow chart of FIG. 4 again involves a START step and a STOP step plus a number of steps 200 to 208 therebetween as described in the following. Specifically, the blocks 200, 202, and 204 correspond to steps designated: "cell construction", "overlap management" (i.e. removing superpositions between adjacent cells) and "intercell space management" (i.e. avoiding that uncovered areas may remain between adjacent cells).

In the cell construction step 200, given a reconfigurable antenna k, the amplitudes of the cells are defined as sums of elementary angular sectors. The corresponding number of cells $N_{cell}(k)$ (here hypothesized to range from 1 to 4) as well as the target traffic $T_{target}$ deriving therefrom according to the relationship previously illustrated are calculated until any of the following criteria is met:

$T(k,j) > T_{target}$ (i.e. the target load for the cell is reached);

$T(k,j) > T_{max}$ (i.e. the maximum load for the cell is reached);

$\Delta(k,j)=\phi_{stop}(k,j)-\phi_{start}(k,j)>\Delta_{max}$ (i.e. the maximum amplitude or width for the cell is reached;

$\phi_{stop}(k,j)-\phi_{az}(k)>\delta_{az}$ and $\phi_{az}(k)-\phi_{start}(k,j)>\delta_{az}$ (i.e. the maximum angular distance from the mechanical azimuth of the antenna is reached).

Angular entities are expressed in terms of number of elementary sectors.

The iterative procedure begins by setting $N_{cell}(k)=1$. Subsequently, the value of $N_{cell}(k)$ can be increased as a result of the "intercell space management" step 204 described in the following.

The following description (which refers to FIGS. 5 to 8) details the sector analysis underlying the cell construction process in four distinct situations as identified by the number of cells of the reconfigurable antenna (namely $N_{cell}(k)$) equal to 1, 2, 3, and 4, respectively).

Figure 5:
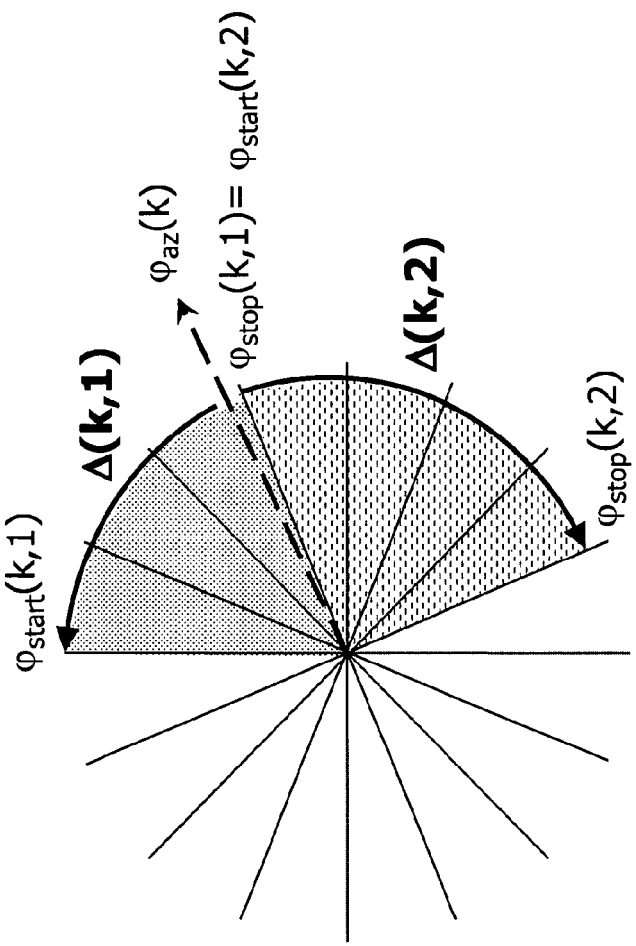
FIGS. 5 to 12 are graphical representations of various subsequent processing steps performed within the framework of the arrangement described herein.

$N_{cell}(k)=1$ (FIG. 5)

The first elementary sector of the only cell is the one containing the azimuth $\phi_{az}(k)$; elementary sectors are then added on both sides e.g. by proceeding clockwise and counterclockwise beginning from the elementary sector containing $\phi_{az}(k)$, until one of the conditions for cell completion listed above is met.

Figure 6:
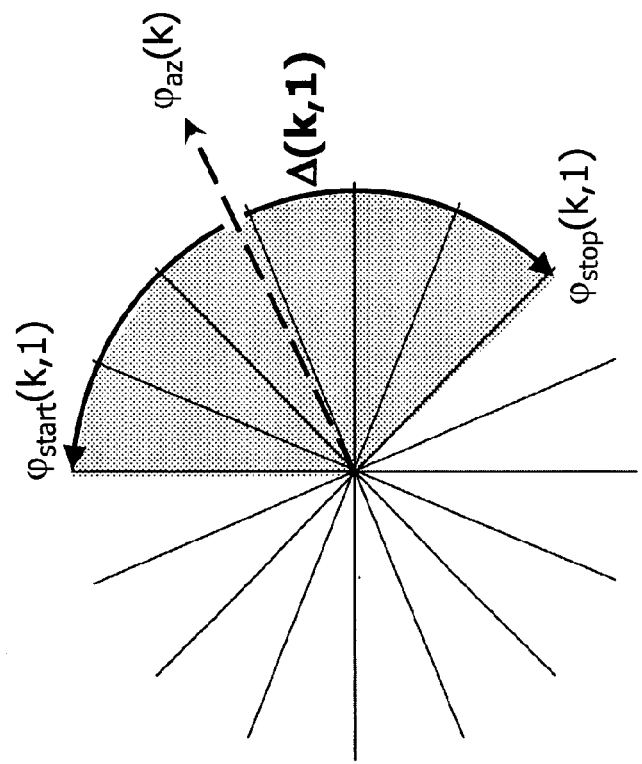

$N_{cell}(k)=2$ (FIG. 6)

The cell (k,1) is constructed starting from the elementary sector that contains the azimuth $\phi_{az}(k)$ by adding elementary sectors counterclockwise until one of the conditions for cell completion listed above is met; the cell (k,2) it is constructed similarly by proceeding clockwise starting from the elementary sector that is "clockwise" adjacent to the cell (k,1) that contains the azimuth $\phi_{az}(k)$ by adding, always in a clockwise direction, new elementary sectors until one of the conditions for cell completion listed above is met.

Figure 7:
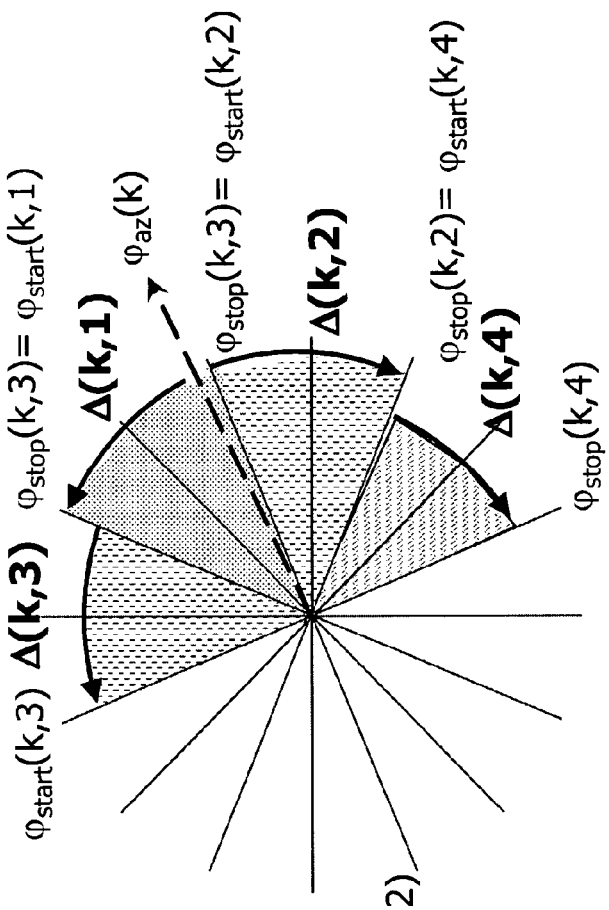

$N_{cell}(k)=3$ (FIG. 7)

The cell (k,1) is constructed as in the case where $N_{cell}(k)=1$, that is by adding elementary sectors alternatively clockwise and counterclockwise starting from the elementary sector containing the azimuth $\phi_{az}(k)$ until one of the conditions for cell completion listed above is met. The cell (k,2) and the cell (k,3) they are constructed by proceeding, respectively, clockwise starting from the elementary sector that is "clockwise" adjacent to the cell (k,1) and counterclockwise beginning starting from the elementary sector that is "counterclockwise" adjacent to the cell (k,1), in both cases until one of the conditions for cell completion listed above is met.

Figure 8:
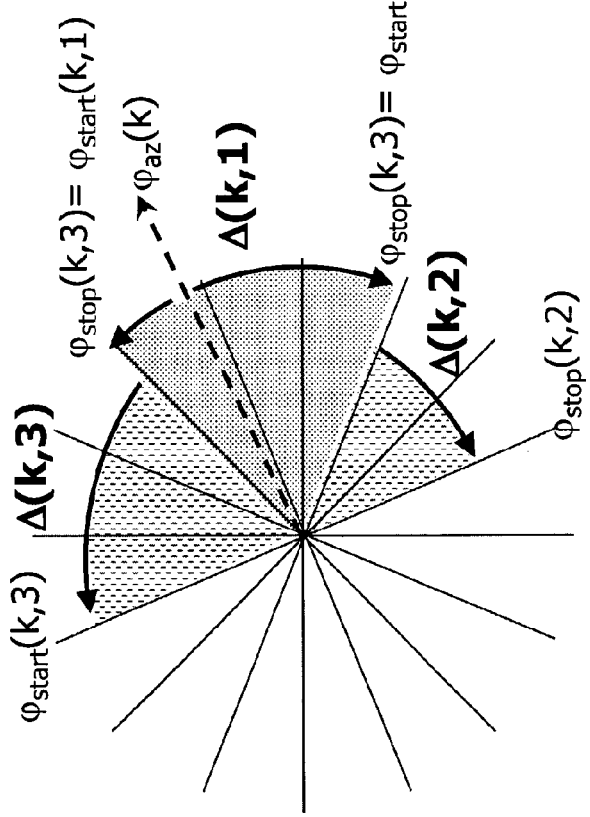

$N_{cell}(k)=4$ (FIG. 8)

The cell (k,1) and the cell (k,3) are constructed proceeding counterclockwise in the aggregation of the elementary sectors, while the cell (k,2) and the cell (k,4) are constructed proceeding clockwise until one of the conditions for cell completion listed above is met.

The sector analysis for the determination of the optimum amplitude to be assigned to the cell is applied independently for each reconfigurable antenna of the site. The first step typically involves hypothesizing a single cell for each reconfigurable antenna.

Figure 9:
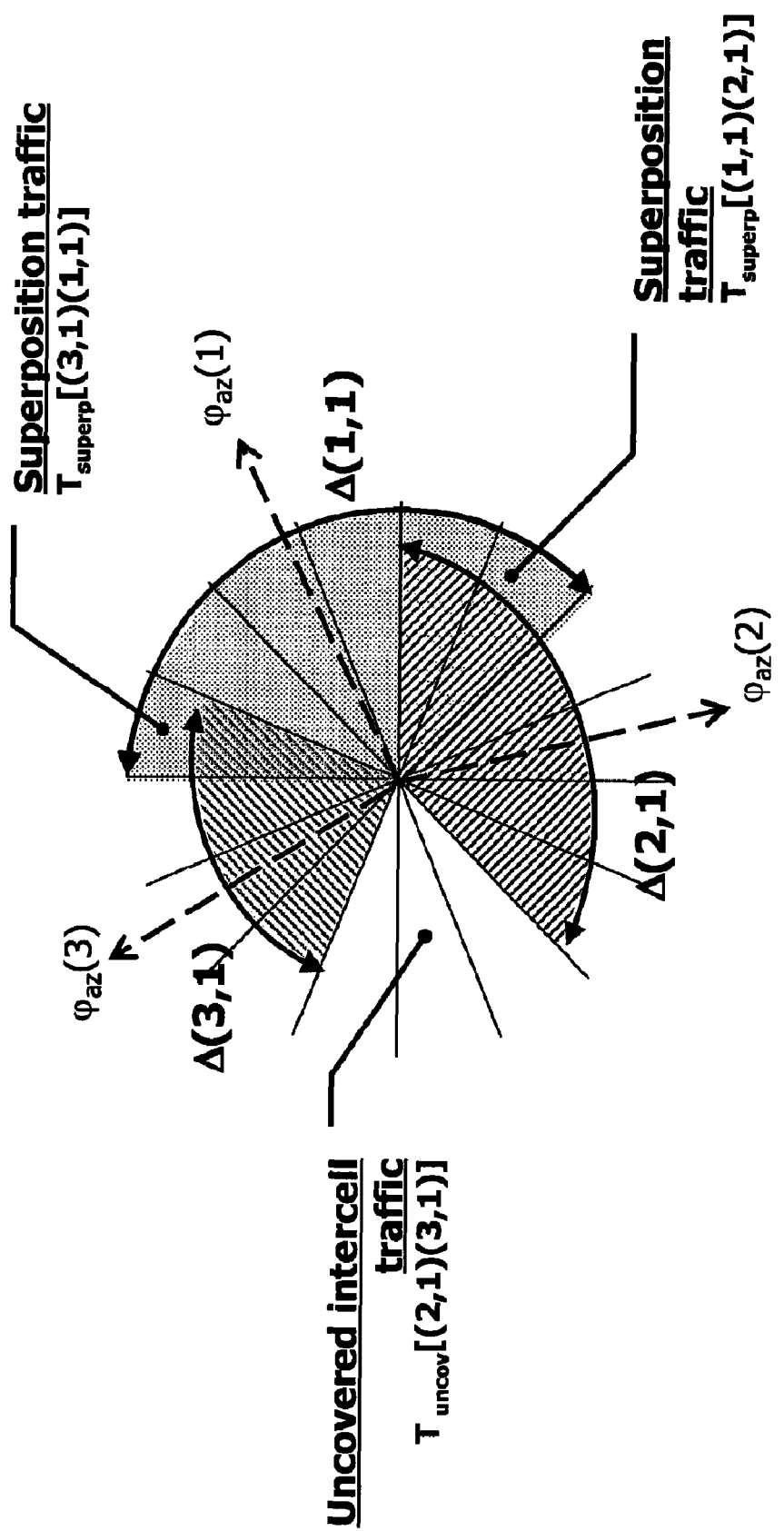

If, for instance, a reconfigurable site equipped with three reconfigurable antennas is considered, at the end of the first step of the optimization process a situation will generally occur similar to the one illustrated in FIG. 9, involving both areas (comprised of one or more elementary sectors) giving rise to superposition (overlap) with cells belonging to different antennas and areas (again notionally comprised of one or more elementary sectors) that are left uncovered in that they are not reached by any of the cells constructed, thus giving rise to "intercell spaces"

In the following, traffic offered to elementary sectors that belong to an overlap/superposition will be designated "superposition traffic", while the traffic (notionally) offered to those elementary sectors that belong to a intercell space will be designated "uncovered (intercell) traffic."

In the presently preferred embodiment of the arrangement described herein, the following formalism is adopted for representing the superposition traffic and the uncovered traffic:

$T_{superp}[(k,j)\ (k',j')]$ will denote the superposition traffic between the cell j of the reconfigurable antenna k and the cell j' of the reconfigurable antenna k'.

$T_{uncov}[(k,j)\ (k',j')]$ will denote the uncovered traffic in the space between the cell j of the reconfigurable antenna k and the cell j' of the reconfigurable antenna k'.

In the specific example represented in FIG. 9, the following applies:

$T_{superp}[(1,1)(2,1)]$ will denote the superposition traffic between the cell 1 of the antenna 1 and the cell 1 of the antenna 2;

$T_{superp}[(3,1)(1,1)]$ will denote the superposition traffic between the cell 1 of the antenna 3 and the cell 1 of the antenna 1;

$T_{uncov}[(2,1)(3,1)]$ will denote the uncovered traffic associated to the intercell space that separates the cell 1 of the antenna 2 and the cell 1 of the antenna 3.

The process for managing superpositions or overlaps (i.e. the step 202 of FIG. 4) is activated downstream of the cell construction step 200 whatever the number (e.g. 1 to 4) of cells assigned to the antenna of the site. The step 202 has the object of removing possible overlaps/superpositions among the cells.

The superposition management process starts from the superposition having the higher superposition traffic associated therewith.

FIG. 6 exemplifies the presence of a single cell for each of the three antennas in the site, by assuming that the following condition is met:

$T_{superp}[(1,1)(2,1)]>T_{superp}[(3,1)(1,1)]$

The superposition [(1,1)(2,1)] is thus considered first. For each of the overlapping cells, i.e. (1,1) and (2,1) the non-superposed traffic (generally denoted $T_{non-superp}$, while the same formalism described above for the superposition traffic is adopted for the cell indexes) is calculated. This is obtained by subtracting the superposition traffic from the traffic offered to the cell:

$T_{non-superp}(1,1)=T(1,1)-T_{superp}[(1,1)(2,1)]$ $T_{non-superp}(2,1)=T(2,1)-T_{superp}[(1,1)(2,1)]$ The cell having the lowest non-superposed traffic acquires the elementary sector having superposed traffic that is most internal to it (i.e. closest to the angular direction of the "mechanical" azimuth) and the associated traffic adds to the non-superposed traffic of the same cell. Downstream of such acquisition, the values for the non-superposed traffic for the cells are again determined to identify again the cell having the smallest amount of non-superposed traffic. Such a cell will then be assigned the innermost sector therein.

This process is continued until no superposed elementary sectors remain, so that the superposition is removed. The process is repeated in an iterative manner by considering each and every superposition that is present.

Figure 10:
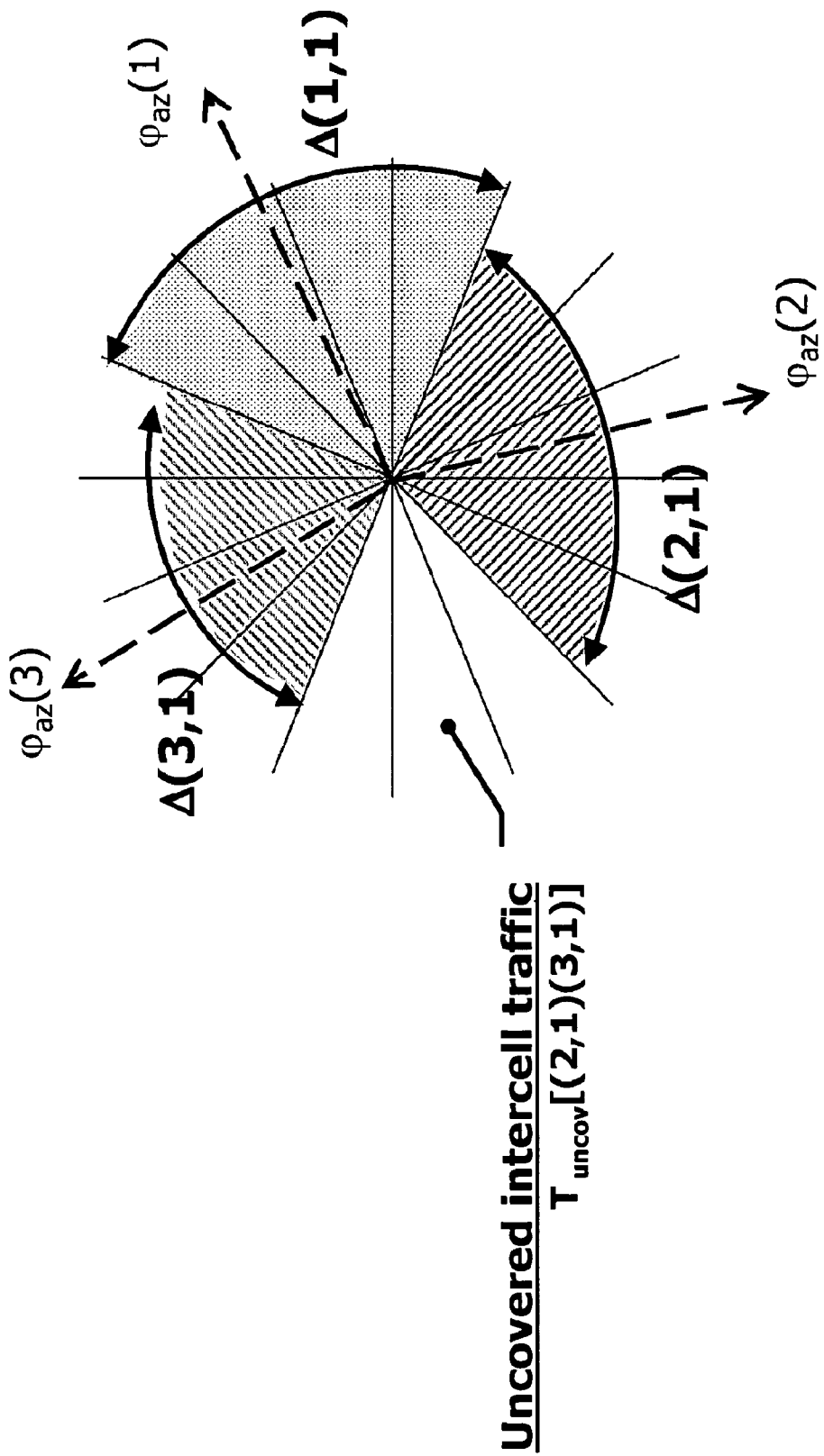

FIG. 10 exemplifies a site configuration obtained as a result of managing the superpositions shown in FIG. 9:

the superposition [(1,1)(2,1)] has been managed by attributing one of the two elementary sectors to the cell (1,1) and the other in the cell (2,1);

the superposition [(3,1)(1,1)] has been managed by attributing the single overlapping elementary sector overlap to the cell (3,1).

The step 204, devoted to managing the intercell spaces has the object of removing with intercell spaces, i.e. the areas found to be uncovered.

The step 204 starts by managing the intercell space to which the higher/highest value of uncovered traffic is associated and involves, for each intercell space, the following phases:

i) the two adjacent cells are examined to identify the cell having the lower value of offered traffic (it will be appreciated that, as a result of the step 202, the site configuration no longer includes superpositions);

ii) the cell so identified is checked to see whether it can acquire the neighboring elementary sector (which belongs to the intercell space being examined) without violating any of the conditions on the maximum amplitude, the azimuth or the target traffic $T_{target}$ considered previously;

iii) the process loops back to phase i) and proceeds in an iterative manner by analyzing the remaining unassigned sectors until assignment is completed or all the cells have reached their limits of expansion in terms of number of sectors or maximum traffic.

If, downstream of these phases, the intercell spaces are completely eliminated (positive outcome of a step 206), the process is terminated and the cells of the reconfigurable site are defined (in number and amplitude, that is in terms of the number of elementary angular sectors of its own competence).

Conversely, if unassigned elementary sectors still exist (negative outcome of a step 206), the reconfigurable antenna that manages the maximum value of traffic (obtained by adding the traffic levels of the cells associated therewith) is found and a check is made as to whether it is still possible to increase the number of cells.

In the positive case, in a step 208, the system increases the number of cells and loops back to the cell construction step 200. The process is iterated until the intercellar spaces are completely eliminated.

In the negative case, i.e. if the number of cells cannot be increased since the maximum number (for instance 4) has already been reached, the elementary sectors not yet assigned are attributed to the adjacent cells even if such attribution exceeds the load limits for these cells.

Figure 11:
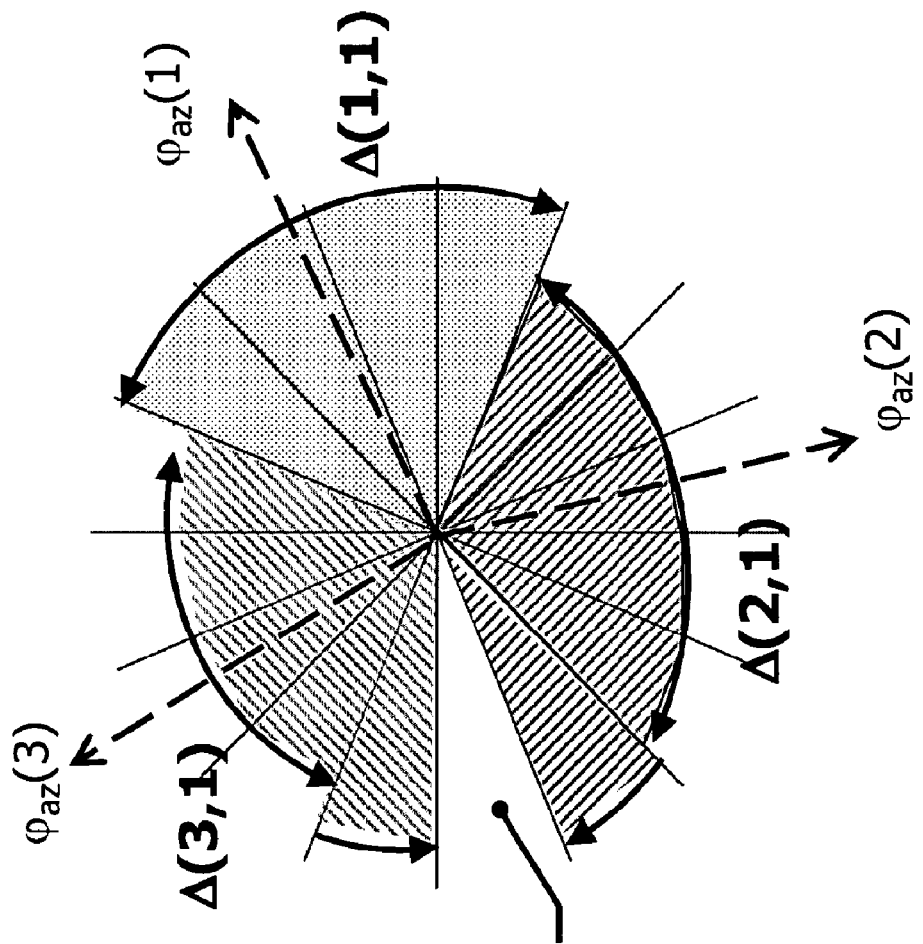
Figure 12:
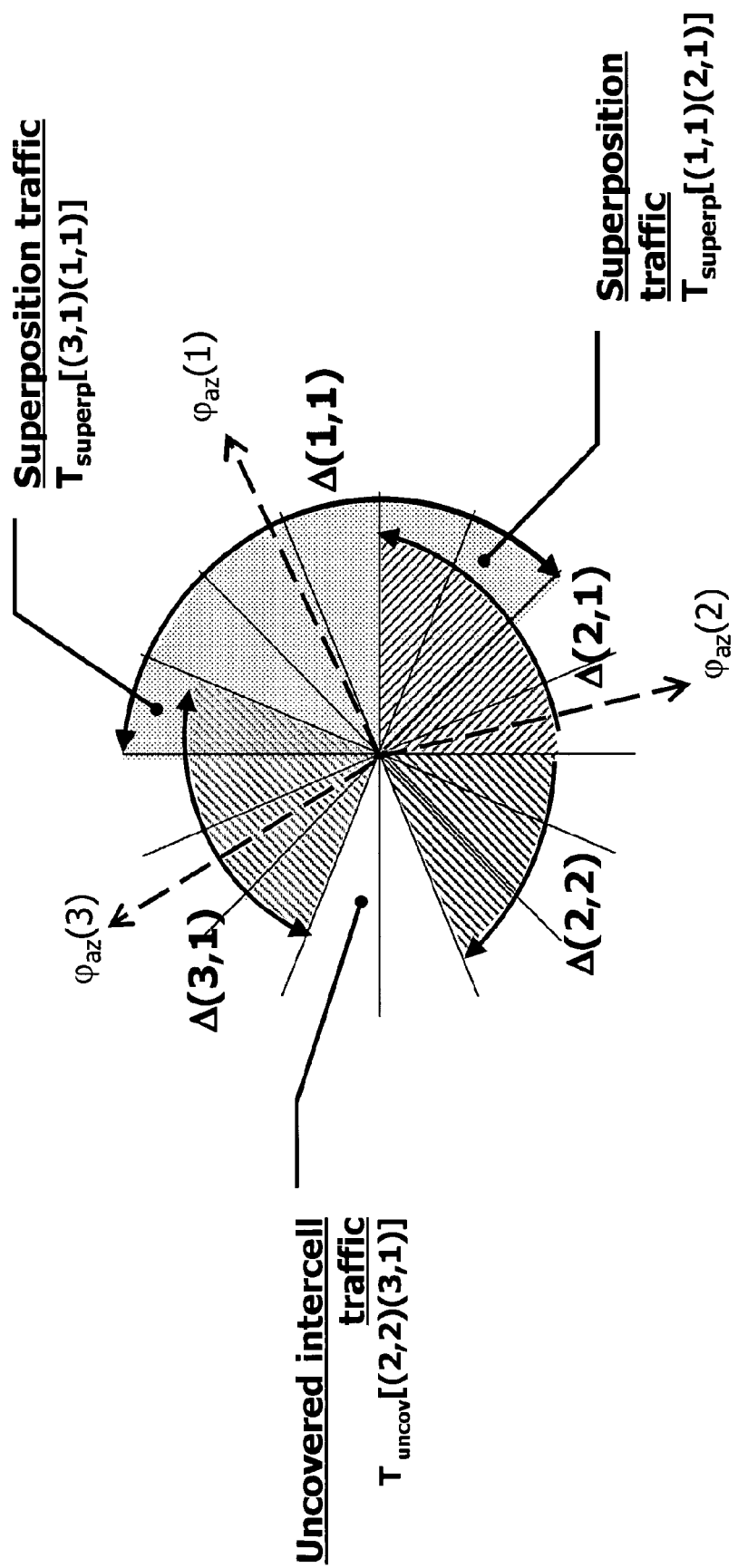

The various operations just described are exemplified in FIGS. 10 and 11, where—out of the three elementary sectors belonging to the intercell space [(2,1)(3,1)], one is acquired by the cell (2,1), one is acquired by the cell (3,1) and one remains uncovered. As a result, the number of cells associated to the reconfigurable antenna 2 (to which six elementary sectors are attributed in the configuration of FIG. 11) is increased from 1 to 2. The new sector partitioning, where two cells are assigned to the reconfigurable antenna 2, is schematized in FIG. 12.

Even if this event is not expressly catered for in the preceding description, case may occur where (either before or after the superpositions are removed) no uncovered areas are revealed. In that case, the optimization process may involve reducing the number of cells and checking whether the desired coverage may be achieved with a smaller number of cells.

The optimization process described herein proceeds (step 104 of FIG. 1) with the definition of the optimum diagram in the vertical plane (V) for each of the cells previously identified. In the vertical plane V an approach can be adopted which is thoroughly similar to the approach adopted in the horizontal plane H (i.e. by using a mask). In a preferred embodiment, a radiation diagram is considered in the vertical plane defined as a diagram equivalent to the diagram that would be defined by hypothesizing the presence of a single 3 dB lobe having a width $\alpha_{3dB}$ with a tilt angle such as to maintain the 3 dB lobe confined within a distance equal to the highest value R(j) among the maximum distances (i.e. the pixels farthest away from the site) associated to the elementary sectors included in the cell j being considered.

Given a cell identified by a certain number of elementary sectors, the optimum electrical tilt (i.e. the tilt obtained by exploiting the reconfigurable nature of the antenna) is calculated via the following relationship:

$$\theta(j) = \arctan\left(\frac{h_{BTS}(j) - h_{UE}(j)}{R(j)}\right) + \frac{\alpha_{3dB}}{2}$$

where:
- $h_{BTS}(j)$ is the altitude (over sea level) of the reconfigurable antenna associated with the cell;
- $h_{UE}(j)$ is a reference altitude (over sea level) for the generic user to be served by the cell: such a reference altitude can determined as a function of the average altitude in the cell and the average height of the buildings therein, both calculated on the pixels belonging to the elementary sectors in included in the cell;
- R(j) is the value defined in the foregoing;
- $\alpha_{3dB}/2$ is the half-amplitude of the vertical lobe of the diagram V considered (independent from the value of tilt); the value for $\alpha_{3dB}$ is determined from the number of elements of the array along the vertical axis on the basis of criteria that are well known to these experts of the sector.

Figure 13:
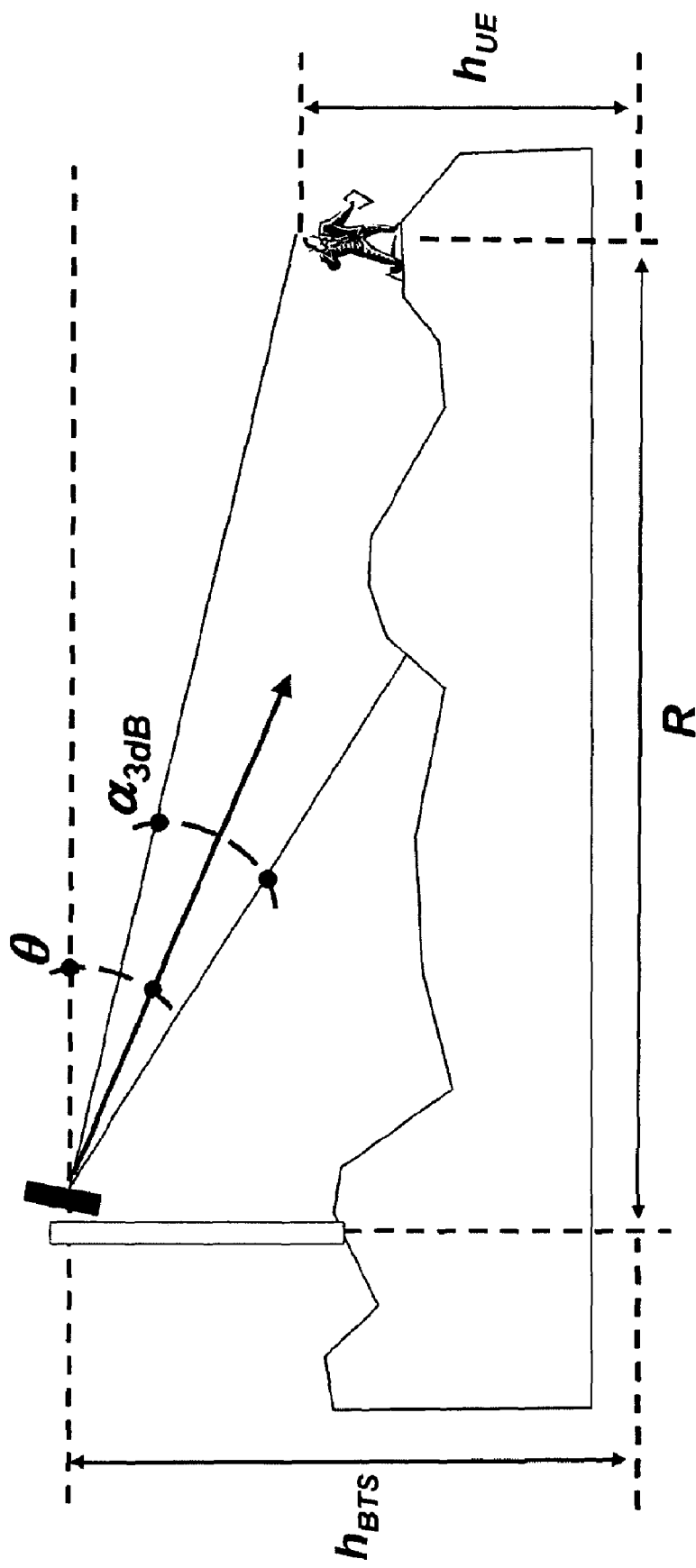
FIGS. 13 to 15 are representative of certain entities involved in the various steps of FIGS. 3 to 12.

The meaning of the parameters discussed above is illustrated in FIG. 13.

Subsequently, the optimization process generally represented in the flow chart of FIG. 1 proceeds with a step 106 devoted to the definition of the optimum diagram on the horizontal plane ("H diagram").

The optimization process described so far defines the angular amplitudes of the radiation diagrams on the horizontal plane, which are coherent with the angular amplitudes of the cells. Reconfigurable antennas do however offer a higher degree of flexibility, in that they also permit an optimization of the angular distribution of the energy radiated within each cell. This can be achieved by properly defining the shape of the H diagram.

The procedure for defining the H diagram the construction of a "cell mask" starting from the values of the representative attenuations of the various elementary sectors and from the distribution of the offered traffic. The cell mask is defined on the basis of the following procedure:

a weight $p_i$ is calculated for each elementary sector by considering the values of traffic and representative attenuation associated with the related sector on the basis of the following relationship:

$$p_i = \frac{A_i^{rap}}{\max_{l \in j}(A_l^{rap})} + \frac{T_i}{\max_{l \in j}(T_l)}$$

where j denotes the cell that contains the sector i, $A^{rap}_i$ denotes the value of the representative attenuation for the sector i, expressed on a linear scale, while $T_i$ is the traffic offered to the sector overall. In calculating the weight $p_i$, the two quantities are normalized by dividing them by the maximum representative attenuation and by the maximum traffic, respectively, as evaluated over the sectors belonging to the cell;

for each cell, two vectors having elements ($\phi_i$, $m_i$) are constructed having dimensions equal to the number of elementary sectors that comprise the cell, where the elements $\phi_i$ correspond to the angular direction of the axis of the elementary sector while the elements $m_i$ are calculated according to the following relationship:

$$m_i = \begin{cases} \dfrac{p_i}{\max_{l \in j}(p_l)} & \text{if the elementary sector } i \text{ belongs to the cell } j \\ 0 & \text{otherwise} \end{cases}$$

In practice, the vector so built contains values selected between 0 and 1 that, insofar as the elementary sectors belonging to the cell are concerned, correspond to the values of the weights calculated previously and subsequently normalized with reference to the maximum value of the weights of each cell;

the cell mask is formally represented by a vector of e.g. 721 elements (corresponding to a discretization of the angle of 360 degrees into steps of 0.5 degrees). The values of the elements of this vector are defined by interpolating the values derived from the vector constructed at the previous step that has a resolution equal to the amplitude of the elementary sector (typically 5°). In a preferred embodiment, a third degree polynomial interpolation is used, of a known type.

Figure 14:
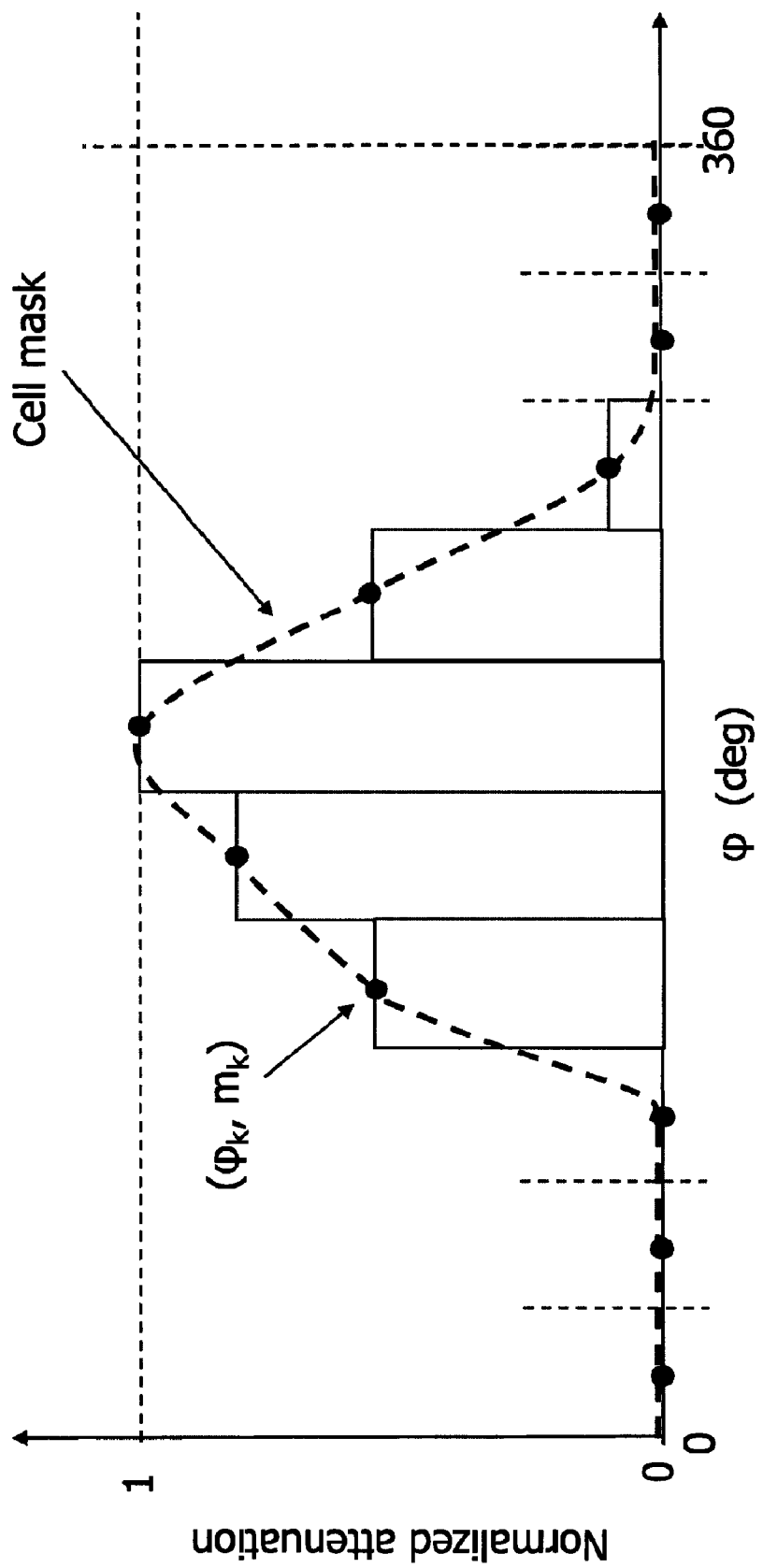
Figure 15:
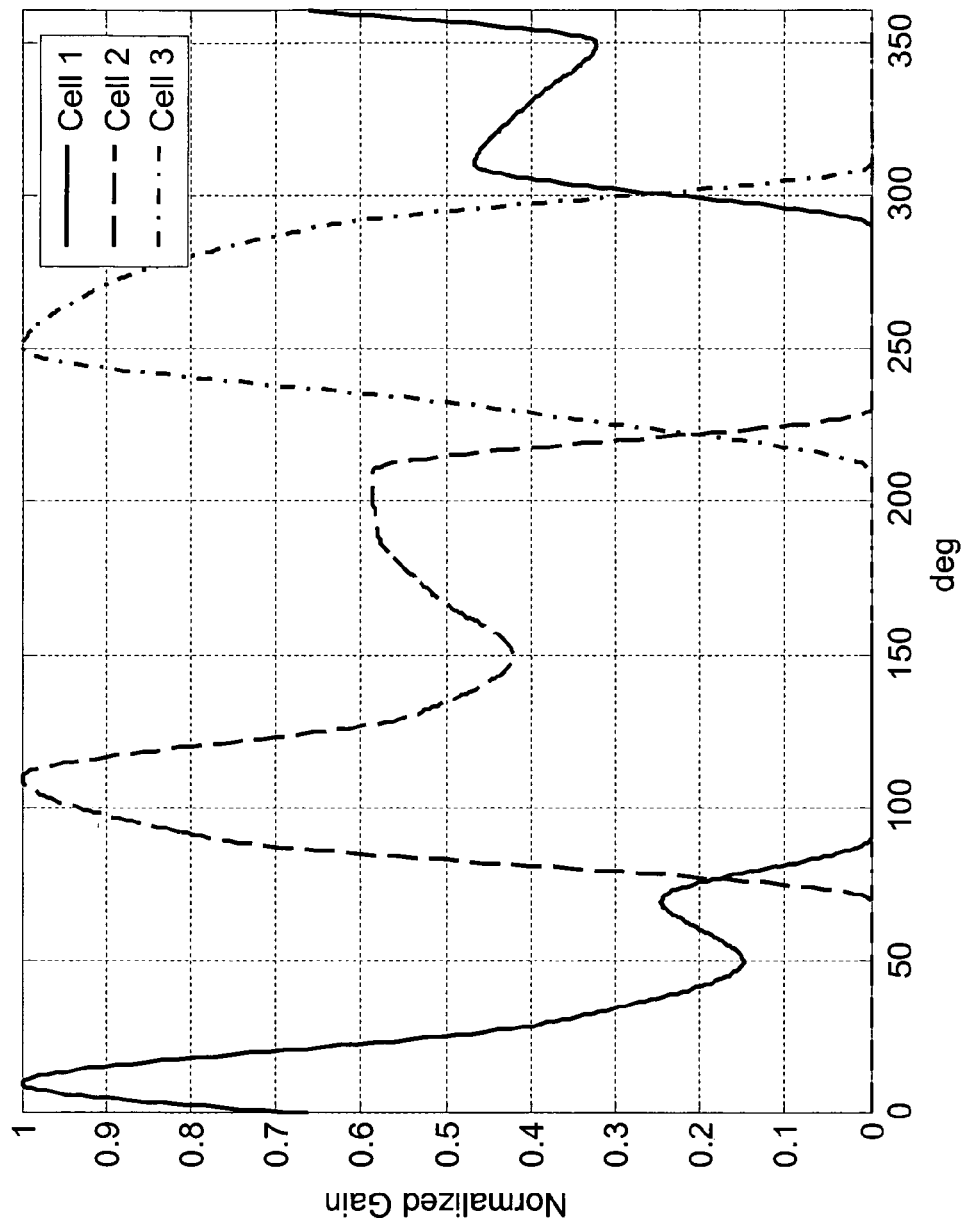

The meaning of the parameters discussed above is illustrated in FIG. 14. FIG. 15 reproduces some exemplary cell masks associated to a site including three sectors or cells. In the example shown, the three array antennas (reconfigurable antennas) have mechanical azimuth values of 10, 130 and 270 degrees, respectively.

According to the general system layout illustrated, by way of non-limiting example in FIG. 16, the optimization process described herein lends itself to being carried out automatically by means of a computer program loaded into a computer 10.

In a particularly preferred embodiment, described in the following, the output of the optimization process described herein is essentially comprised of the following entities, defined for each reconfigurable antenna:
number of activated cells $Q_k$;
tilt of each of the activated cells $H_{k,j}$;
horizontal diagram (H), described by the cell mask $H_{k,j}$ for each of the activated cells (for instance discretized as a vector of 721 elements).

This information is transferred from the computer 10 to the control server 20 of e.g. a mobile telecommunication network. Such a server is typically present in all mobile telecommunication networks to centralize the basic control functions of the network. These consist, e.g., of: 1) monitoring performance indicators (for instance the total power transmitted from the cell) and alarms made available by the different network apparatuses (adapted, for instance, to identify failure or malfunctioning); 2) dispatching towards network apparatus commands with the object of modifying the operational criteria of this apparatus: these commands include for instance commands sent to the RET (Remote Electrical Tilt) equipment installed on the antennas of the radio base stations in order to modify (by acting from the server 10) the pointing of these antenna.

The information needed for reconfiguring the antennas associated with the different cells are sent from the server 20 towards the various base stations 30 that in turn forward this information over channels 40 adapted to carry this information (generally designated 50) towards control units 60 associated with the antennas 70. In a preferred embodiment, the information 50 is conveyed in the form of commands transmitted in binary format and in transparent way over digital connections extending between the server 20 and the radio base stations 30 and between the radio base stations and the control units 60 of the reconfigurable antennas 70. In a preferred embodiment, a separate command is transmitted for each reconfigurable antenna.

Together with the information on the diagrams provided as an output by the optimisation process, the server 10 can send towards the antennas additional information/commands to control the power to be assigned to the pilot channels of the various cells. Specifically, this command is transmitted at least when the optimization process leads to a change in the number of cells associated to an antenna.

The information derived from the algorithm process can be transported within the command 50 in different ways or modes. Three of these are given as a non-limiting example.

Mode 1: on the basis of antenna synthesis techniques of a known type (see e.g. R. J. Mailloux "Phased Array Antenna Handbook" 2nd Edition, Artech House, 2005 pages 109-121) a program installed in the computer 10 translates the information on the tilt and on the horizontal diagram provided by the optimization process into corresponding configurations of weights to be sent to the different elements of the array that constitutes the antenna. For each antenna k, $Q_k \times N_k \times M_k$ complex weights are computed, where $N_k$ and $M_k$ correspond to the dimensions of the (plane) array, while $Q_k$ represents the number of cells activated the antenna. The complex weights so calculated are converted into binary numbers and transferred to the server 20 according to digital techniques of a known type. In the server 20 the weights are included in a control command to be sent to the control unit 60. The control unit 60 in turn sends to each of the some $N_k \times M_k$ elements that comprise the reconfigurable antenna 70 the $Q_k$ sets of weights that define the antenna diagram for each of the $Q_k$ cells that are activated.

Mode 2: the outputs of the optimization process (number of activated cells, value of tilt for each cell, horizontal diagram (H), properly discretized for each cell) are transferred by the computer 10 to the server 20 and from here on to the control unit 60 in the form of a command 50. For each activated cell, the control unit 60 synthesizes the complex weights to be allotted to the elements of the array and transmits to each element in the antenna array 70 the corresponding weight. This occurs on the basis of known techniques analogous to those used in Mode 1 as previously described.

Mode 3: the computer 10 and the control unit 60 contain databases for possible antenna diagrams. For each type of reconfigurable antenna, a different database is present. By way of non-limiting example one may consider the simple case where all the reconfigurable antennas are of the same type. In this case, the database will have the following structure:

[i] ⇔ [complex weights (i)] ⇔ [$H_i$][$t_i$]

Each index in the database identifies a configuration of complex weights that defines a diagram Hi (described by a vector of e.g. 721 elements) and a value of tilt $t_i$. For each reconfigurable antenna k and for each cell j activated in the antenna k, a program installed in the computer 10 performs a correlation among the cell mask $H_{j,k}$ provided as an output by the optimization process and the diagrams $H_i$ present in the database. Such procedure allows to calculate, for each of the diagrams $H_i$, a coefficient of correlation $C_i$, for instance on the base of the following relationship:

$$C_i = \frac{\text{cov}(H_{j,k}, H_i)}{\sqrt{\text{cov}(H_{j,k}, H_{j,k}) \cdot \text{cov}(H_i, H_i)}}$$

where the function cov(X,Y) it is defined by the following relationship:

$$\text{cov}(X,Y) = E\{[X - E(X)] \cdot [Y - E(Y)]\}$$

and the function E{X}, applied to a vector of e.g. 721 elements, each of which denoted by $x_i$, corresponds to the following relationship:

$$E\{X\} = \frac{1}{721} \sum_{l=1}^{721} x_l$$

The coefficient $C_i$ with the highest value corresponds to the diagram $H_i$, out of those included in the database, which is most similar to the cell mask. If different indexes exist (for instance i and i') corresponding to identical diagrams $H_i$ and $H_{i'}$, the system identifies the index corresponding to a tilt value which is closer to the tilt value provided by the optimization process, namely $t_{j,k}$. In that way, the process identifies the index corresponding to the pair $[H_i]$ $[t_i]$ that is more similar to the one identified by the optimisation process. Typically, a specific index i is identified for each cell j, while however the same diagram with an index can be associated with different cells. The $Q_k$ indexes so identified for each reconfigurable antenna k are transferred by the computer 10 to the server 20 and from this on to the control unit 60 of the antenna 70, through a command 50. By resorting to a database similar to that included in the computer 10, the control unit 60 identifies the $Q_k$ sets of complex weights corresponding to the $Q_k$ values included in the command 50 and sends them to the elements in the antenna array 70.

Consequently, without prejudice to the underlying principles of the invention, the details and the embodiments may vary, even appreciably, with reference to what has been described by way of example only, without departing from the scope of the invention as defined by the annexed claims.

The invention claimed is:

1. A method for configuring an antenna site equipped with at least one reconfigurable antenna in a communication network, said antenna site having capacity to serve communication traffic in a respective area of competence, comprising the steps of:
partitioning said area of competence in a reference set of cells; and
evenly distributing said communication traffic among said cells in said set for optimizing the number of cells in said set,
said step of evenly distributing said communication traffic among said cells comprising the steps of:
a) checking said set of cells to locate:
   i) areas of superposition between adjacent cells, wherein said areas of superposition correspond to areas covered jointly by traffic capacity of adjacent cells in said set of cells, and
   ii) uncovered areas between adjacent cells, wherein said uncovered areas correspond to areas not covered by traffic capacity of any cell in said set of cells;
b) removing said areas of superposition whereby traffic capacity is made available from either of the adjacent cells that gave rise to superposition;
c) assigning to said uncovered areas said traffic capacity made available by removing said areas of superposition; and
d) if any uncovered areas remain, increasing the number of cells in said reference set of cells, and repeating steps a) to d) above.

2. The method of claim 1, wherein if no uncovered areas between adjacent cells are located, comprising the steps of decreasing the number of cells in said reference set of cells, and repeating steps a) to d) above.

3. The method of claim 1, wherein said step of removing said areas of superposition is started from cells in said reference set of cells giving rise to superposition and having associated therewith a higher traffic level.

4. The method of claim 1, wherein said step of removing said areas of superposition comprises the step of at least partly assigning coverage of said areas of superposition to one of said adjacent cells having associated therewith a lower traffic level.

5. The method of claim 1, wherein said assigning to said uncovered areas said traffic capacity made available is started from uncovered areas having associated therewith a highest level of traffic left uncovered.

6. The method of claim 1, wherein said assigning to said uncovered areas said traffic capacity made available comprises the step of at least partly assigning coverage of said uncovered areas to the one of said adjacent cells having associated therewith a lower traffic level.

7. The method of claim 1, wherein said increasing the number of cells in said reference set of cells if any uncovered areas remain, comprises splitting into two a cell in said reference set of cells having associated therewith a highest traffic level in the set.

8. The method of claim 1, comprising the step of determining an area of competence as a set of pixels satisfying the following requirements:
a field received at the pixel from an isotropic antenna equipping said antenna site is higher than fields received from cells associated with other sites in the communication network; and
the field received at the pixel from said isotropic antenna equipping said antenna site is higher than a minimum threshold.

9. The method of claim 8, comprising the step of determining communication traffic associated with said cells and any elementary sectors thereof by adding traffic associated with the pixels belonging thereto.

10. The method of claim 1, comprising the steps of:
partitioning an area of competence into elementary sectors of constant angular amplitude in a horizontal plane; and
aggregating said elementary sectors to form said cells.

11. The method of claim 10, wherein said elementary sectors have an angular amplitude of 5 to 20 degrees.

12. The method of claim 10, wherein said elementary sectors have an angular amplitude which is a submultiple of 360°.

13. The method of claim 1, wherein said step of evenly distributing said communication traffic among said cells in said set comprises checking communication traffic associated with each cell in said set against a maximum value of traffic.

14. The method of claim 1, wherein said step of evenly distributing said communication traffic among said cells in said set comprises checking each cell in said set against at least one of:

an angular width of the cell reaching a maximum value; and the cell reaching a maximum angular distance from a mechanical azimuth of the antenna.

15. The method of claim 1, comprising the step of associating with an optimized number of cells, a respective radiation diagram of said reconfigurable antenna in at least one of a vertical and a horizontal plane.

16. A system for configuring an antenna site equipped with at least one reconfigurable antenna in a communication network, said antenna site having capacity to offer communication traffic in a respective area of competence and having associated therewith a control unit to control the configuration of said at least one reconfigurable antenna, comprising at least one computer configured for performing the method of claim 1, and capable of sending to said control unit, antenna configuration commands corresponding to results of said method.

17. The system of claim 16, wherein said at least one computer configured for converting said results into configuration data of a radiation diagram of said at least one reconfigurable antenna and sending said configuration data toward said control unit.

18. The system of claim 16, wherein said at least one computer is configured for sending said results toward said control unit and said control unit is configured for converting said results into configuration data of a radiation diagram of said at least one reconfigurable antenna.

19. The system of claim 16, wherein:

said at least one computer and said control unit have respective databases for storing possible radiation diagrams of said at least one reconfigurable antenna;

said at least one computer is configured for identifying in a database, as a function of said results, a given possible radiation diagram of said at least one reconfigurable antenna and sending toward said control unit a corresponding index; and said control unit is configured for identifying in its database, as a function of said index, a given possible radiation diagram of said at least one reconfigurable antenna and configuring said at least one reconfigurable antenna according to said given possible radiation diagram.

20. A communication network comprising an antenna site equipped with at least one reconfigurable antenna, said antenna site having capacity to serve communication traffic in a respective area of competence and having associated therewith a control unit to control the configuration of said at least one reconfigurable antenna, wherein said control unit is adapted to reconfigure said at least one reconfigurable antenna using results generated by the method of claim 1.

* * * * *

UNITED STATES PATENT AND TRADEMARK OFFICE
CERTIFICATE OF CORRECTION

PATENT NO. : 7,962,178 B2
APPLICATION NO. : 12/308897
DATED : June 14, 2011
INVENTOR(S) : Ludovico et al.

Page 1 of 1

It is certified that error appears in the above-identified patent and that said Letters Patent is hereby corrected as shown below:

On the title page, item [57], in the abstract, line 4,
"partitioning the area the area of competence" should read
--partitioning the area of competence--.

In the Claims
Claim 17, column 17, line 25, "computer configured" should read
--computer is configured--.

Signed and Sealed this
Eighteenth Day of February, 2014

Michelle K. Lee
*Deputy Director of the United States Patent and Trademark Office*